Feb. 13, 1923.
T. C. MOORSHEAD.
MACHINE FOR MAKING PRESSED GLASSWARE.
FILED NOV. 17, 1917.
1,445,345.
13 SHEETS—SHEET 1.
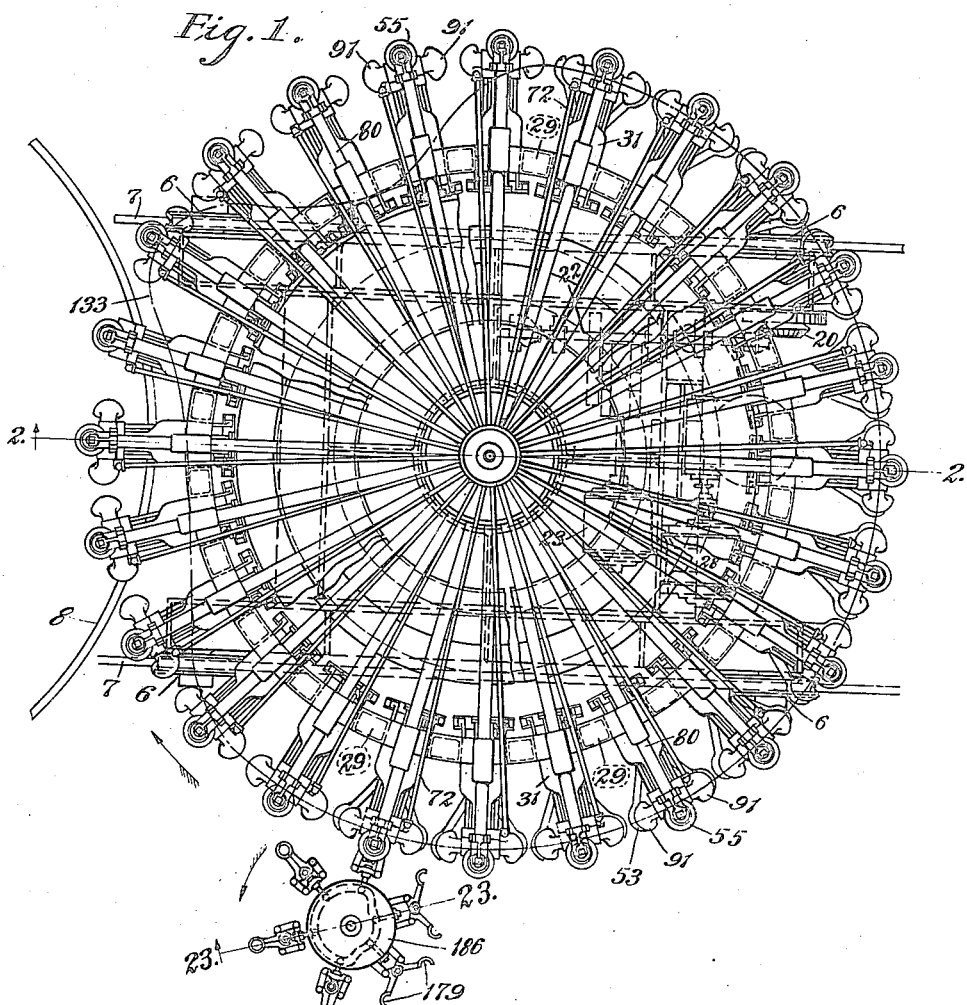
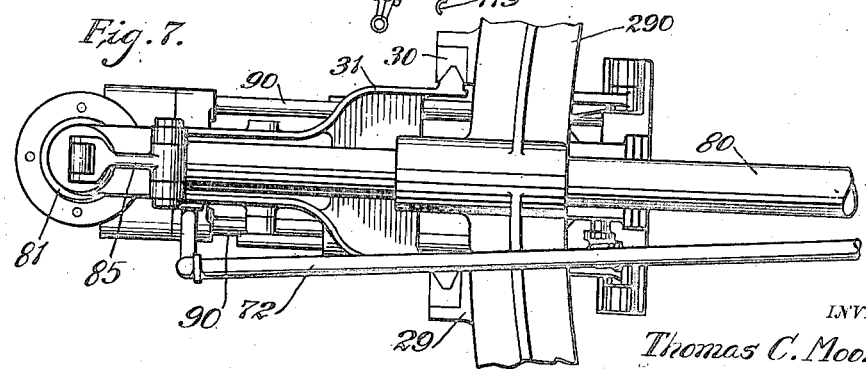
INVENTOR.
Thomas C. Moorshead
BY
John N. Bruninga
ATTORNEY.

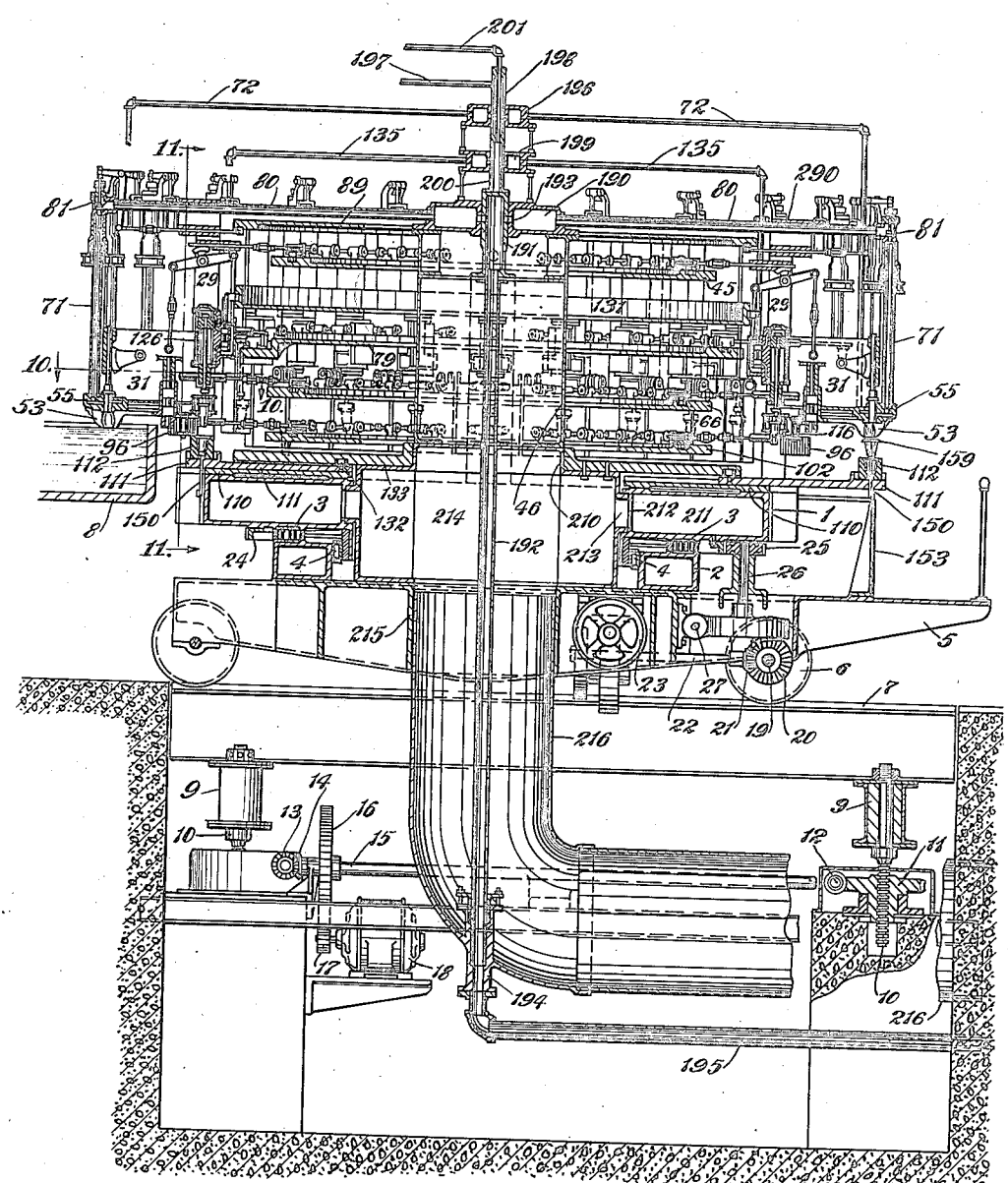

Feb. 13, 1923.

T. C. MOORSHEAD.
MACHINE FOR MAKING PRESSED GLASSWARE.
FILED NOV. 17, 1917.

INVENTOR.
Thomas C. Moorshead
BY
John H. Bruninga
ATTORNEY.

Feb. 13, 1923.

T. C. MOORSHEAD.
MACHINE FOR MAKING PRESSED GLASSWARE.
FILED NOV. 17, 1917.

INVENTOR.
Thomas C. Moorshead
BY John N. Bruninga
ATTORNEY.

Feb. 13, 1923.

T. C. MOORSHEAD.
MACHINE FOR MAKING PRESSED GLASSWARE.
FILED NOV. 17, 1917.

INVENTOR.
Thomas C. Moorshead
BY John H. Bruninga
ATTORNEY.

Feb. 13, 1923.

T. C. MOORSHEAD.
MACHINE FOR MAKING PRESSED GLASSWARE.
FILED NOV. 17, 1917.

INVENTOR.
Thomas C. Moorshead
BY
John H. Bruninga
ATTORNEY.

Feb. 13, 1923.

T. C. MOORSHEAD.
MACHINE FOR MAKING PRESSED GLASSWARE.
FILED NOV. 17, 1917.

1,445,345.

INVENTOR.
Thomas C. Moorshead
BY
ATTORNEY.

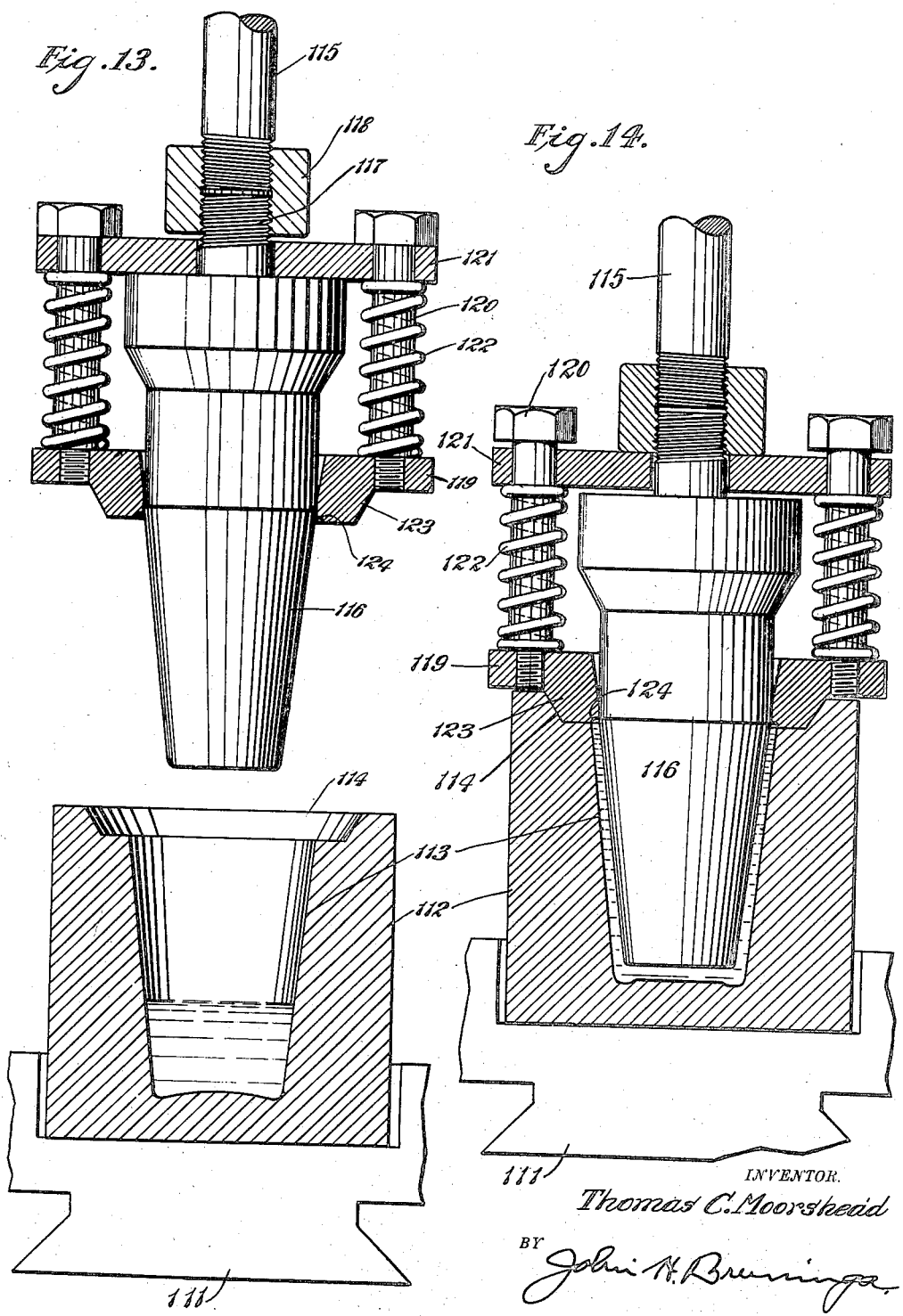

Feb. 13, 1923.

T. C. MOORSHEAD.
MACHINE FOR MAKING PRESSED GLASSWARE.
FILED NOV. 17, 1917.

INVENTOR.
Thomas C. Moorshead
BY
John W. Bruninga
ATTORNEY.

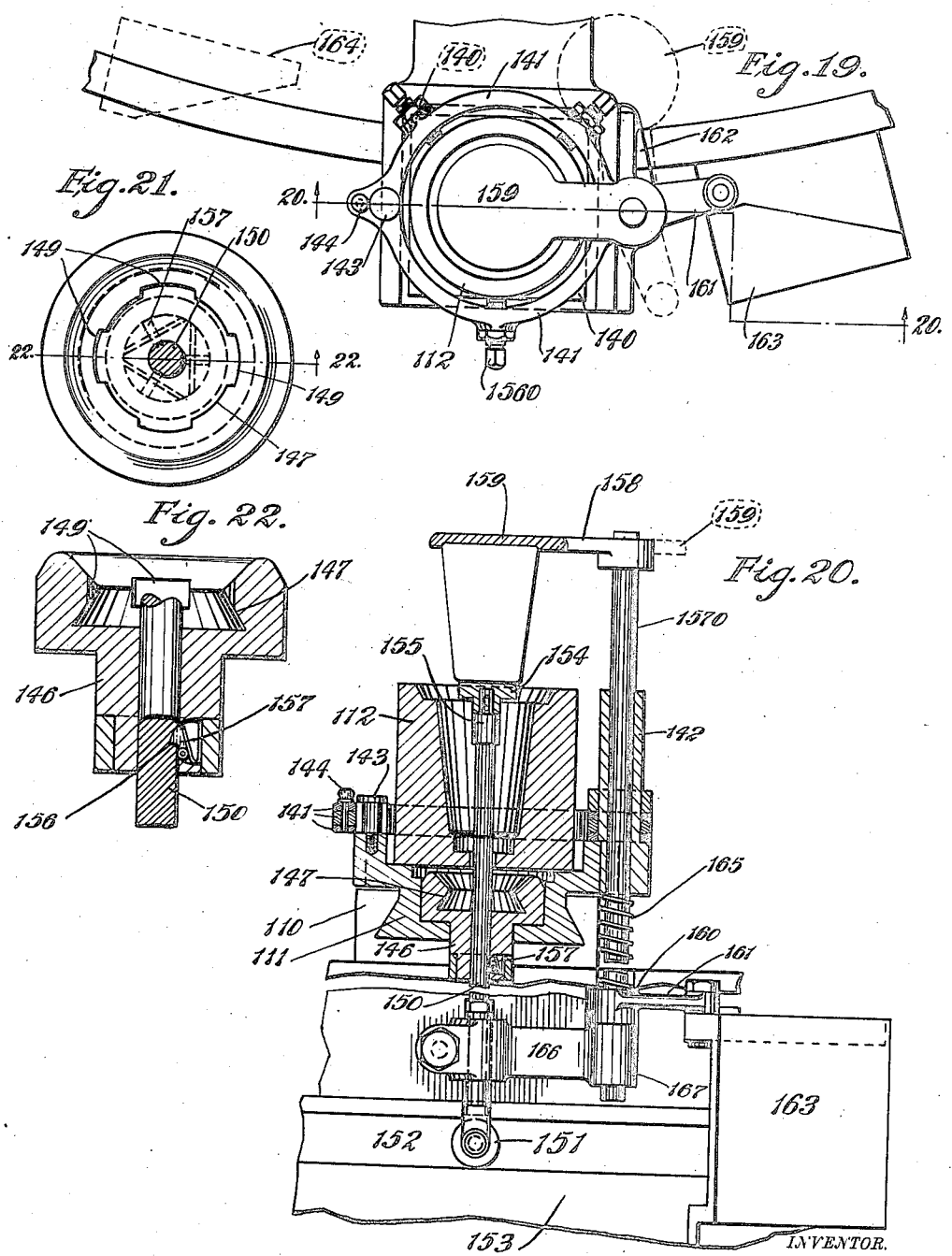

Feb. 13, 1923.  1,445,345.
T. C. MOORSHEAD.
MACHINE FOR MAKING PRESSED GLASSWARE.
FILED NOV. 17, 1917.
13 SHEETS—SHEET 11.
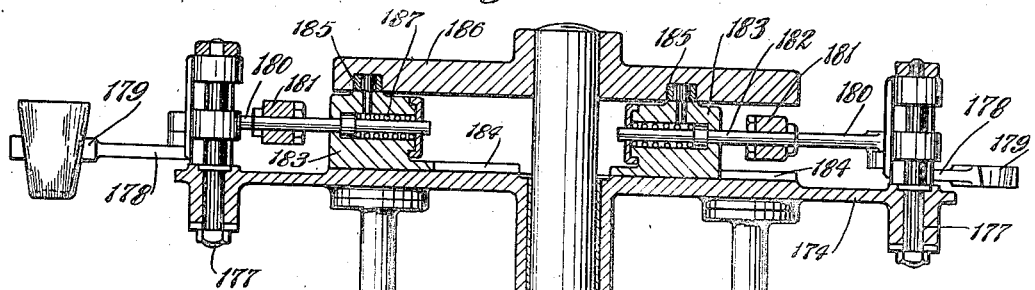
Fig. 23.
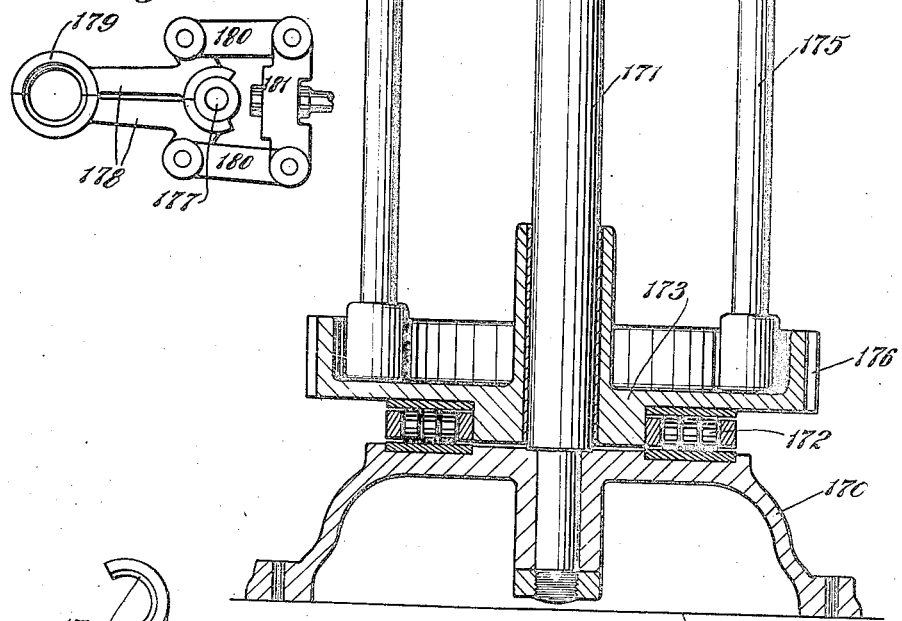
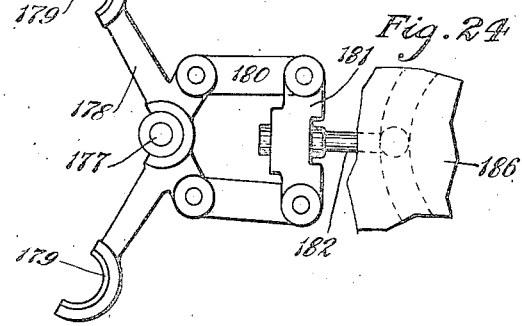
Fig. 24.
INVENTOR.
Thomas C. Moorshead
BY John N. Bruninga
ATTORNEY.

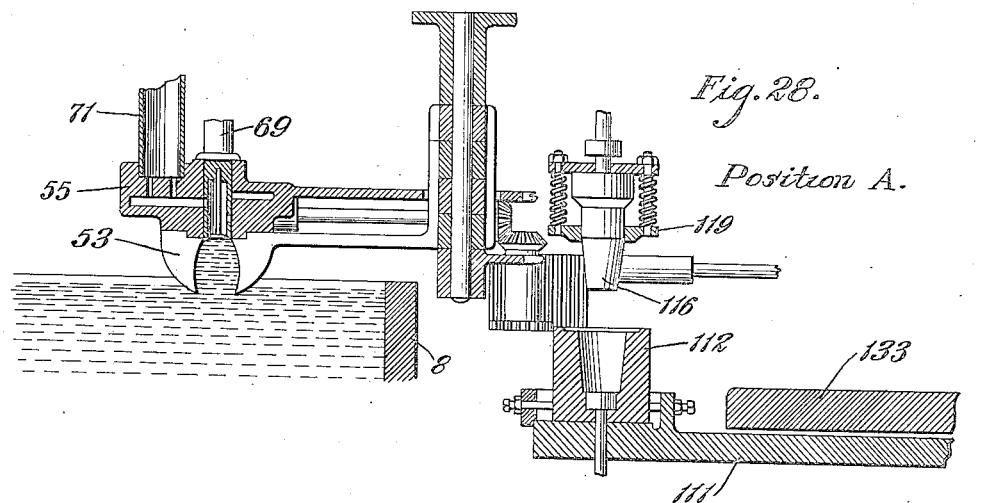
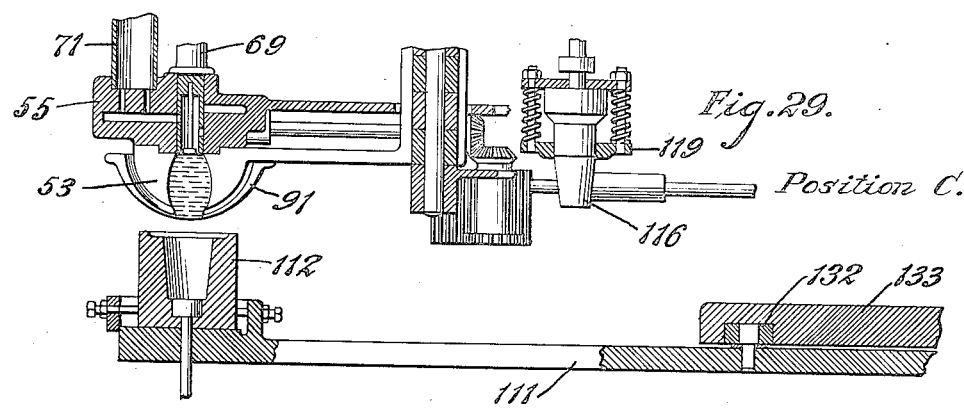
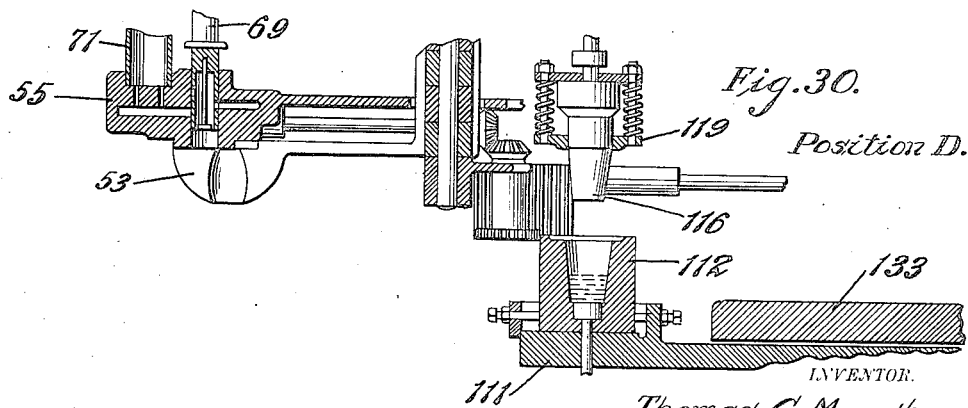

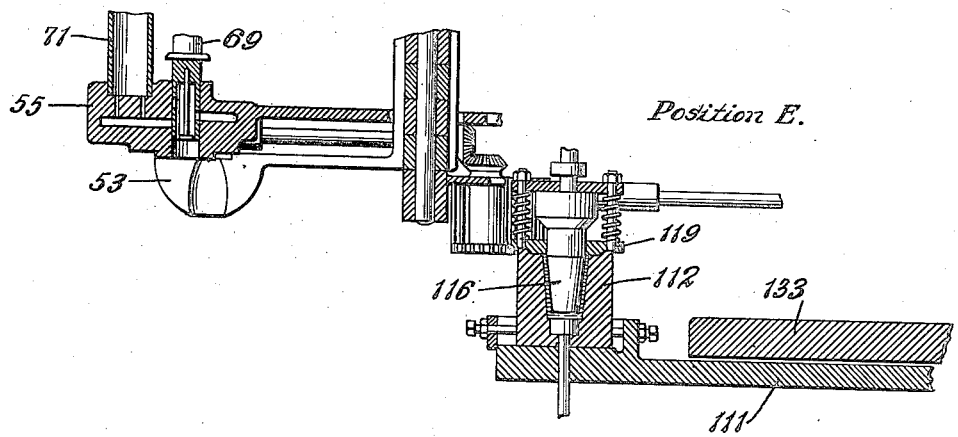
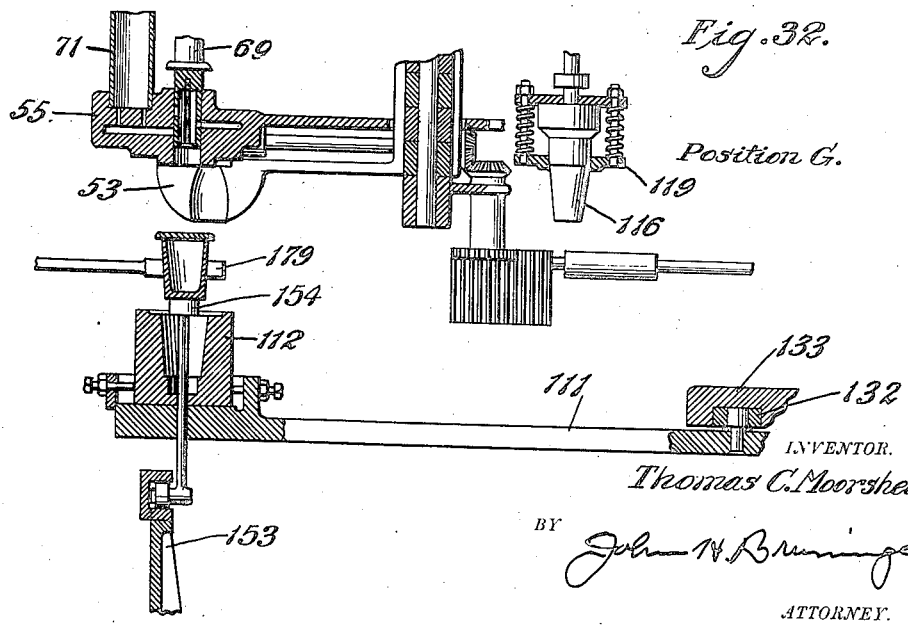

Patented Feb. 13, 1923.

1,445,345

UNITED STATES PATENT OFFICE.

THOMAS C. MOORSHEAD, OF ALTON, ILLINOIS.

MACHINE FOR MAKING PRESSED GLASSWARE.

Application filed November 17, 1917. Serial No. 202,637.

*To all whom it may concern:*

Be it known that I, THOMAS C. MOORSHEAD, a citizen of the United States, and residing at Alton, county of Madison, State of Illinois, have invented a certain new and useful Improvement in Machines for Making Pressed Glassware, of which the following is a specification.

This invention relates to methods and apparatus for working glass, and more particularly to methods and apparatus for making pressed glassware.

Pressed glassware is now made in molding machines comprising molds and formers. In a hand molding machine the glass is fed to the mold by hand. A quantity of glass is gathered by the workman, from the furnace on the end of a rod, taken to the mold and allowed to flow therein; when a sufficient quantity has been allowed to flow into the mold, the mold operator cuts off the stream of pasty molten glass, the gathering rod is taken back to the furnace, and the former is moved into the mold to shape the article. It will readily be seen that with this procedure, even with skilled operators, the quantity of glass deposited in the mold will vary considerably, as it involves pure guesswork on the part of the operator. The pressed articles will, therefore, vary considerably in thickness as well as quantity.

Molding apparatus is now often provided with mechanical feeding devices; with such devices a stream of molten glass is fed from a furnace into a mold, and cut off mechanically. In such devices the quantity of glass delivered to the mold depends, of course, upon the two elements of, the rate of flow of the stream, and the cross-section of the stream. Since, however, even molten glass, at the temperatures most successfully employed, is comparatively viscous, and since the viscosity and, therefore, the rate of flow, varies considerably with the temperature, it will readily be seen that such mechanism cannot feed a measured amount of glass into the mold. Even with these devices, therefore, the articles will necessarily be ununiform in weight and quality.

Another element which enters into the making of pressed glassware is the chilling of the glass during its transit from the furnace to the mold. This element has been neglected and overlooked, because in the construction and operation of glass molding machines, the constructors and operators have unconsciously followed the construction and operation of bottle making machines. In a bottle making machine, the glass is gathered in a blank or parison mold and blown in a finishing mold. In such a machine, a surface chilling becomes necessary in order to form a skin or crust on the glass before it is blown, since otherwise, successful blowing of a hollow article is an impossibility. Accordingly, a quick chilling glass is used, and the glass is exposed for a period after it is gathered, in order to chill the surface and form the necessary skin or crust.

Now the successful operation of machines for making pressed glassware requires exactly the opposite conditions. If the quantity of glass, during its transfer from the furnace to the pressing mold, should become chilled, thereby forming a crust or skin on the surface thereof, this crust will form seams or wrinkles in the glass during the pressing operation, so that the pressed article will not have the desirable clear and smooth surface. It is, therefore, absolutely essential in the operation of a machine for making pressed glassware, that chilling of the glass, during its transit from the furnace to the mold, be avoided. This requires nonexposure of the gathered glass, and rapid action in the gathering, transference and pressing. Moreover, a glass should be used which will not chill.

In order to produce glassware of uniform quality and weight, it is moreover, necessary that a measured amount of glass be deposited in the mold, in order to form an article in accordance with the matrix formed between the mold and the former. Moreover, this mold and former should be so constructed as to take care of slight variations, in order that this matrix may be filled with glass during the pressing operation, in order to form a complete article of the required shape.

Some of the objects of this invention, therefore, are to develop a method and apparatus for making pressed glassware, whereby the glass is so gathered, measured, and so deposited in the mold, and the deposited glass so shaped, that the article formed will be uniform, clear, and have a predetermined shape and weight.

Other objects are to provide a machine which is so constructed as to have the required rapidity of operation and accuracy as to completely form and shape the articles with a minimum amount of labor.

Another object is to provide a machine which is simple in construction, effective in its action, and reliable in its operation.

Other objects are to improve the machine in its details of construction, and in the construction and operation of its subcombinations.

Further objects will appear from the detail description taken in connection with the accompanying drawings, in which, Figure 1 is a plan of a machine embodying this invention;

Figure 2 is a section on the line 2—2, Figure 1;

Figure 7 is a plan of one of the heads;

Figure 13 is an outline detail of the mold and former illustrating its operation;

Figure 14 is a view similar to Figure 13, but showing the former depressed;

Figure 26:
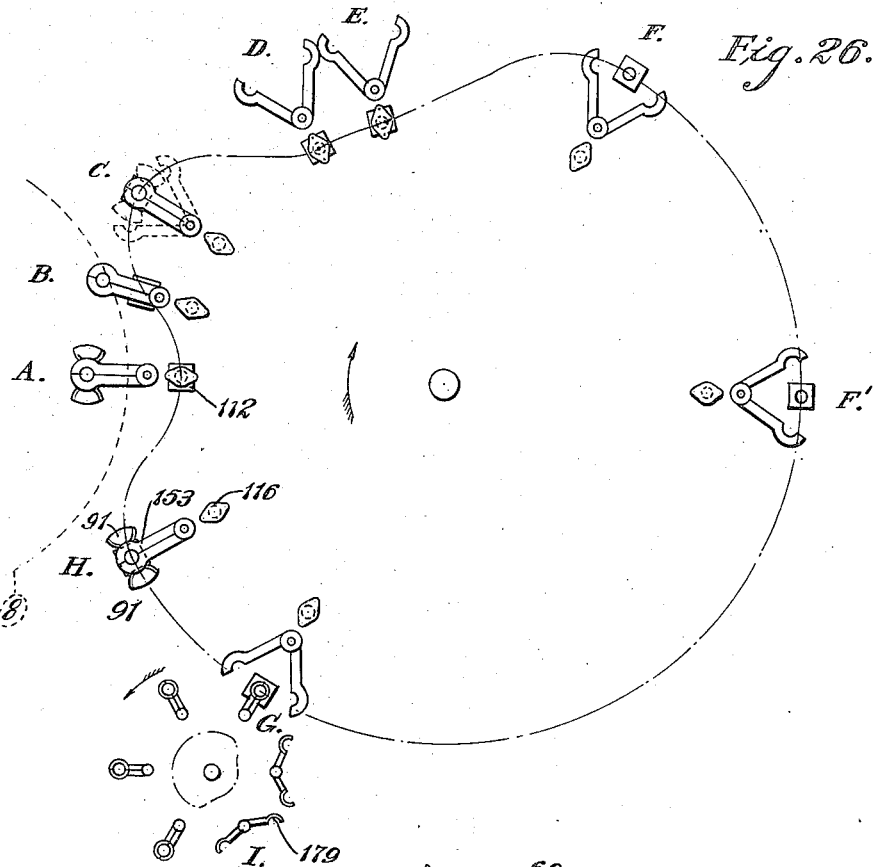
Figure 27:
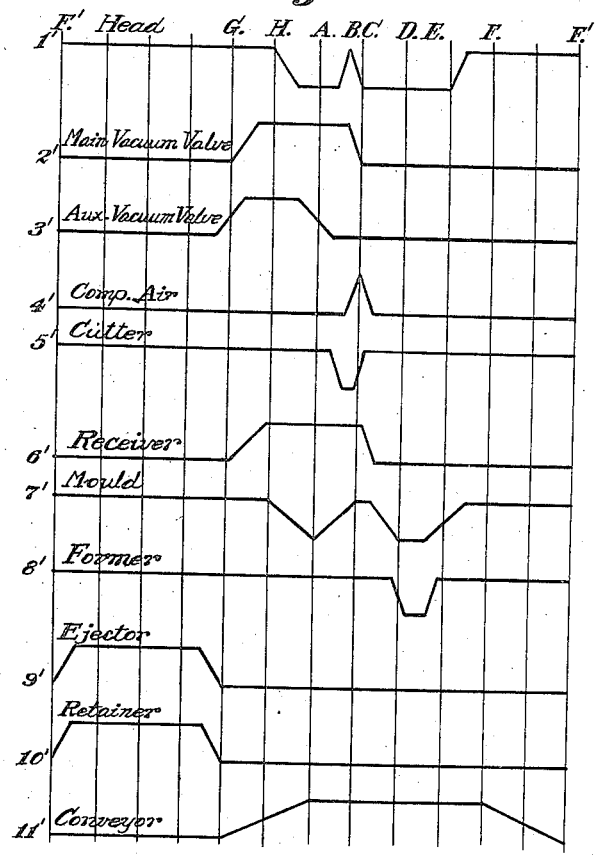
Figure 15:
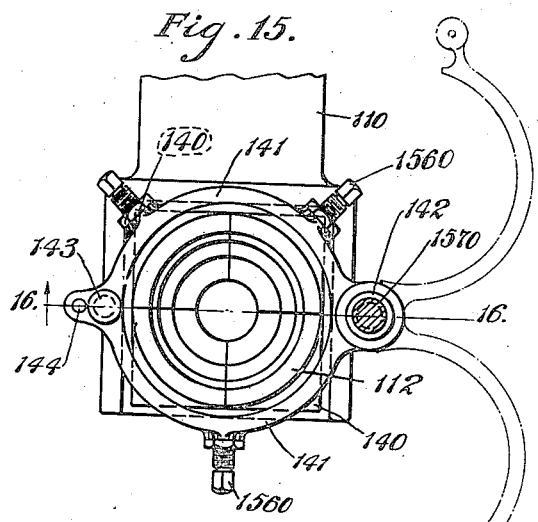
Figure 15 is a plan of the mold.
Figure 17:
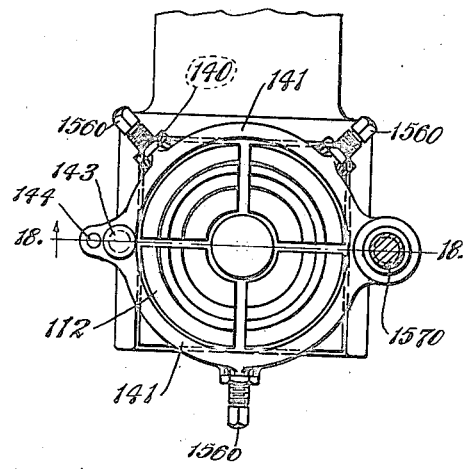
Figure 16:
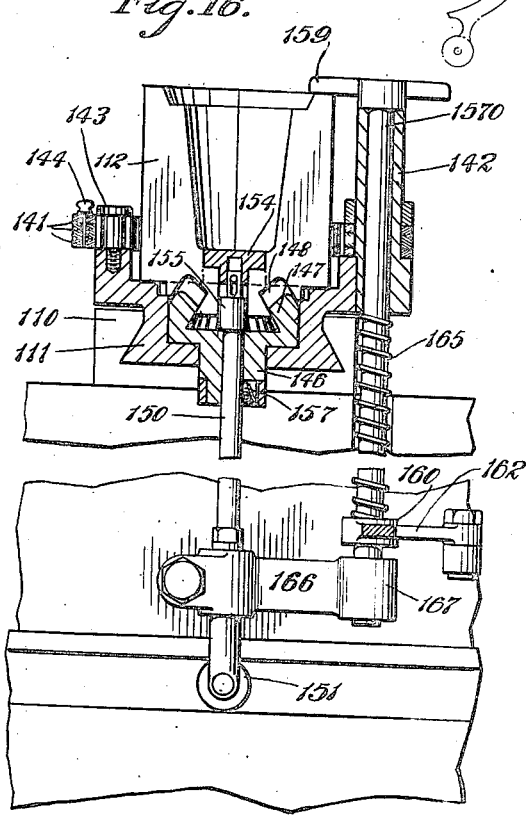
Figure 16 is a section on the line 16—16, Figure 15, showing the mold sections closed.
Figure 18:
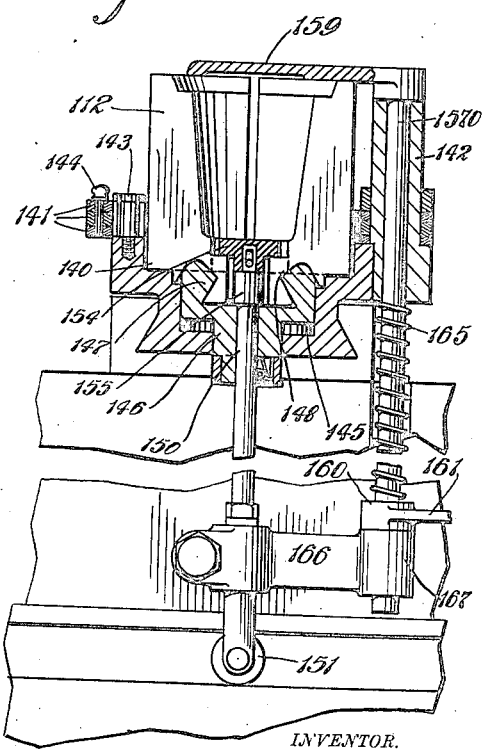

Figures 17 and 18 are views similar to Figures 15 and 16, Figure 18 being a section on the line 18—18, Figure 17, showing the mold sections open;

Figure 19 is a plan of the mold and the ejecting device, showing the ejecting device in a position to eject the formed article;

Figure 20 is a section on the line 20—20, Figure 19;

Figure 21 is a detail of the actuator;

Figure 22 is a section on the line 22—22, Figure 21;

Figure 23 is a section on the line 23—23, Figure 1, showing mechanism for removing the shaped articles;

Figure 24 is a detail of one pair of the article removing devices;

Figure 25 is a view similar to Figure 24, but showing this device in another position;

Figure 26 is a diagram showing the operation of the different mechanisms;

Figure 27 is a cam diagram; and,

Figures 28, 29, 30, 31 and 32 are views showing the mechanisms in their different positions.

In accordance with an embodiment of this invention, as illustrated in the accompanying drawings, and as hereinafter more particularly described, the gathering device gathers from a source of supply, such as a glass tank, a measured quantity of molten glass. For this purpose, the gathering device is provided with a receiver adapted to remain hot and adapted to be dipped into a mass of molten glass, and mechanism is provided for exhausting the air from this receiver when dipped. Since the receiver is constructed to have a definite volume corresponding to the predetermined quantity of glass required to form an article of a predetermined shape and weight, the receiver will be filled with a measured quantity of molten glass. After the receiver has been filled with the measured quantity of molten glass, it is moved away from the tank and the glass is cut off by suitable cutting blades. These cutting blades move in opposite directions under the outlet to the receiver, and cooperate not only to cut off the glass in the receiver from that hanging down into the tank, but also to close the lower end of the receiver. There will be thus drawn in and cut off from the glass supply, a measured quantity of molten glass in the receiver.

The gathering device, together with its measured quantity of molten glass, is moved to clear the tank, and thereafter a pressing mold is moved into cooperative relation with, and under the receiver, to receive the measured quantity of gathered glass. The receiver is now opened at its lower end by the retraction of the cut-off blades, and the measured quantity of molten glass is discharged into the mold. The receiver is provided with means for effectuating such discharge, and this is accomplished by opening the receiver laterally by separating its movable sections, by forcing air under pressure into the receiver, or by both instrumentalities. There will be thus deposited in the pressing mold, a measured quantity of molten glass.

The mold is now moved in cooperative relation with, and underneath a forming plunger, for the purpose of shaping the measured quantity of molten glass in the mold. This former is so constructed and so operated, and has such provisions, as to insure the completion of the shaping operation, in accordance with the predetermined matrix formed between the mold and the former. The parts are; however, so constructed as to compensate for slight variations in the quantity of glass deposited in the mold.

After the forming operation has been thus completed, the former is withdrawn and the mold is moved to a position where the shaped article can be ejected. For this purpose, the mold is provided with a movable bottom which is arranged to rise upwardly through the mold, and eject the shaped article therefrom. For certain classes of work, such as ornamental or bulging glassware, the mold is constructed of sections which, prior to the ejecting operation, are separated in order to permit ready ejection of the shaped article. In order to retain the article while being ejected, a retainer moves over the top of the mold to retain the shaped article in position. After the article has been ejected from the mold, a conveying device operates to remove the shaped article from the ejecting device.

Referring now to the accompanying drawings, and more particularly to Figures 1 and 2, 1 designates a travelling frame mounted for rotation on a base 2, there being provided for this purpose, roller bearings 3 and 4, between the travelling frame and the base, to permit free rotation of the frame on the base. The base is mounted on a sub-frame 5, resting on wheels 6, engaging tracks 7, so that the travelling frame may be moved toward and from the source of glass supply in a tank 8, which is of the usual rotary type. The tracks 7 are mounted in a pit, and in order to permit vertical adjustment, each end of each track rests on a pillar 9, which is provided with a screw 10, engaged by a nut 11, having worm wheel teeth meshing with a worm 12. The shaft of this worm has a bevel gear 13, engaged by a bevel gear 14, on a shaft 15, which has a gear 16 meshing with a pinion 17 on a motor 18. The motor is suitably controlled to run in either direction, and by operation of this motor, the tracks 7 can be raised and lowered to adjust the machine to the glass tank 8.

For the purpose of moving the travelling frame toward and from the glass tank, the axle 19 of one pair of wheels 6, is provided with a bevel gear 20, which meshes with a bevel gear 21, on a shaft 22, which is driven by suitable gearing from a motor 23, so that the motor will move the travelling frame either toward or from the glass tank 8.

In order to rotate the travelling frame 1, it is provided with a toothed ring 24, meshing with a gear 25 on a shaft 26, and this shaft has a worm wheel meshing with the worm on a shaft 27, driven by an electric motor 28.

*The gathering mechanism.*

Figure 9:
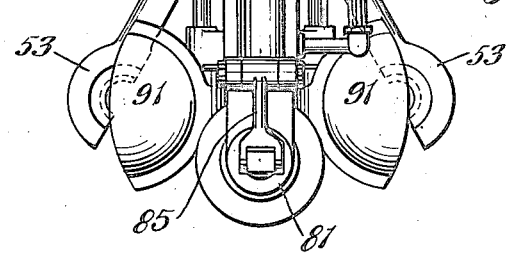
Figure 9 is a similar view showing the parts in the position shown in Figure 4.
Figure 10:
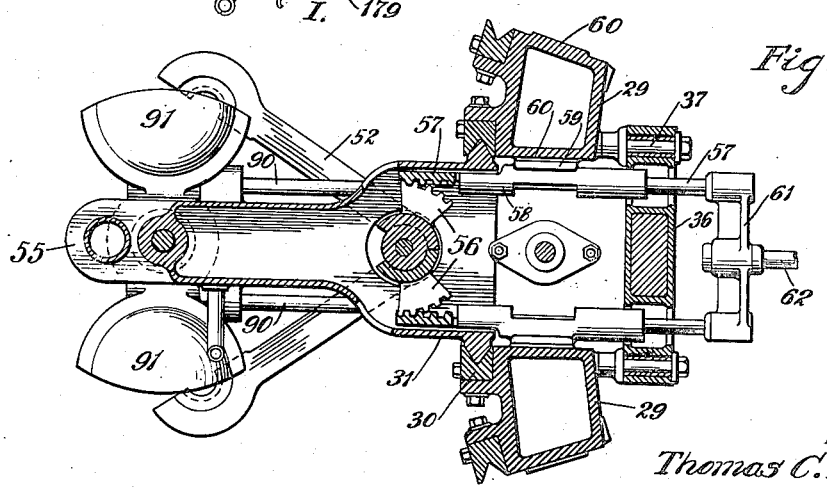
Figure 10 is a section along the line 10—10, Fig. 2.
Figure 11:
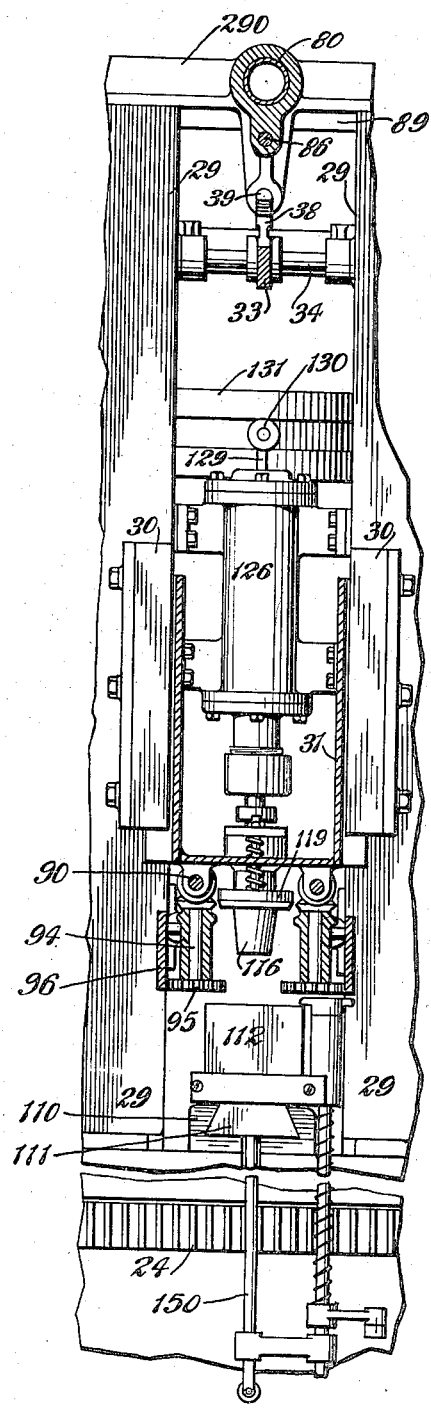
Figure 11 is a section on the line 11—11, Figure 2.
Figure 12:
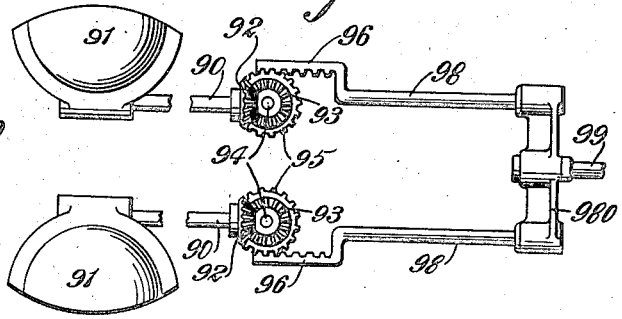
Figure 12 is a detail of the cut-off mechanism.

Referring now to Figures 1 to 12 inclusive, the travelling frame is shown as provided with a series of vertical supports 29, connected at the top by a ring 290, provided with guides 30, in each of which slides a crosshead or carrier 31. The crosshead is connected by an adjustable link 32, with one end of a lever 33, pivoted at 34, between the supports 29 on the travelling frame 3. The other end of the lever is connected by links 35, with a counterbalance 36. This counterbalance, as shown in Figure 10, is slotted and guided by studs 37, on the back of the vertical supports 29. The shaft 34, or the lever 33, has fixed thereto, a toothed segment 38, meshing with a rack 39, guided in a bearing 40, between a pair of supports. The rack is adjustably connected to a suitable turnbuckle 41, with an extension 42 sliding in a block 43. This block carries a cam roll 44, cooperating with a cam groove in a stationary cam 45, fixed to the tubular support 46, carried by the sub-base or frame 5. The extension 42 has fixed thereto, a collar 48, which is held by a spring 49, against the end of the block 43, this block being provided with a removable head 50, to permit assemblage. As the frame 3 rotates, the engagement of the roll 44 with the cam groove in the stationary cam 45, will cause a reciprocation of the rack 39, and this reciprocation will, through the connections with the crosshead, cause a vertical reciprocation of the crosshead to move this crosshead up and down.

Pivoted on a stub-shaft 51, on the crosshead, are a pair of arms 52, which are enlarged at their outer ends, as shown at 53, and these ends are formed to provide a sectional receiver 54, for receiving the gathered glass. The ends of this sectional receiver are recessed to engage closely with the under surface of a head 55, carried by the crosshead, so as to make close joint connections therewith, and the cooperating faces of these sections 53 are preferably formed of separate pieces attached to the arms 52, so that receivers of different sizes, each adapted to hold a predetermined quantity of glass, may be substituted.

Each arm 52 has fixed thereto, a sector 56, co-operating with a rack 57, moving in a guide 58, fixed to the support 29. These guides 58 are provided with machined flanges 59, bearing against machined faces 60, on the support 29, as the crosshead is reciprocated. The racks 57 of a pair, are attached to a common head 61, which has a shank 62 connected by a turn-buckle 63, with a block 64, carrying a cam roll 65, engaging a cam groove in a stationary cam 66, fixed to the tubular support 46. The connection between the shank 62 and the block 64, is as heretofore described with reference to the connection between the shank 42 and the block 43. During the rotation of the travelling frame 3, with respect to the stationary cam 66, the cam connections to the sectional receiver carrying arms 52, will operate to separate and engage the receiver sections, so as to open and close the receiver. It will, however, be noted that the yielding connection between the block 64 and its cam roll 65, will operate to yieldingly close the receiver by compressing the spring 49, so that the receiver will be firmly closed to make substantially a closed joint cavity.

Formed in the head 55 are ports 67 and 68, which form, respectively, the vacuum and compressed air ports. Sliding in the head 55 is a tubular valve 69, having ports adapted to cooperate with the ports 67 and 68. The bottom of this valve is nearly closed by a plug 70, which leaves only a small annular space between the plug and the valve. This annular space, while sufficiently large to permit the passage of air therethrough, is sufficiently small to prevent the entrance of glass. The port 67 is connected with an exhaust pipe 71, while the port 68 is connected with a compressed air pipe 72.

The stem 73 of the valve 69, has a sliding bearing in the crosshead 31, and this stem is toothed to provide a rack meshing with a segment 74, pivoted in the crosshead and having fixed thereto, a segment 75 meshing with a rack 76, also having a bearing in the crosshead. The shank of this rack 76 is yieldingly connected with a block 77, in a manner as hereinbefore described, and this block carries a cam roll 78, engaging the cam groove in a stationary cam 79, fixed to the support 46. With this construction, rotation of the travelling frame will cause the connections between the stationary cam 79 and the valve 69, to reciprocate the valve in order to control the ports 67 and 68, in a manner hereinafter described.

Mounted on the travelling frame between a pair of supports 29, is an exhaust pipe 80, and fixed to the outer end of this exhaust pipe is a valve casing 81, with which is connected the exhaust pipe 71. In order to provide for a sliding connection between the valve casing and the exhaust pipe 71, carried by and reciprocating with the crosshead 31, this valve casing is machined to permit sliding of the pipe 71 therein, and a gland 82 is provided to form a tight joint between the two. In order to cut off the valve casing and the exhaust pipe 71 from the exhaust pipe 80, this valve casing is provided with a port 83, opened and closed by a valve 84, the stem of which is connected with one arm of a bell crank lever 85, pivoted on the valve casing, the other end of this bell crank lever being connected with an adjustable link 86, sliding in a bearing 87, between and on a pair of supports 29. This link is provided with a cam roll 88, engaging a cam groove in the stationary cam 89 fixed to the tubular support 46. With this construction, rotation of the travelling frame 3 will, through the connection between the stationary cam 89 and the valve 84, operate to open and close the connection between the exhaust pipes 71 and 80.

Figure 5:
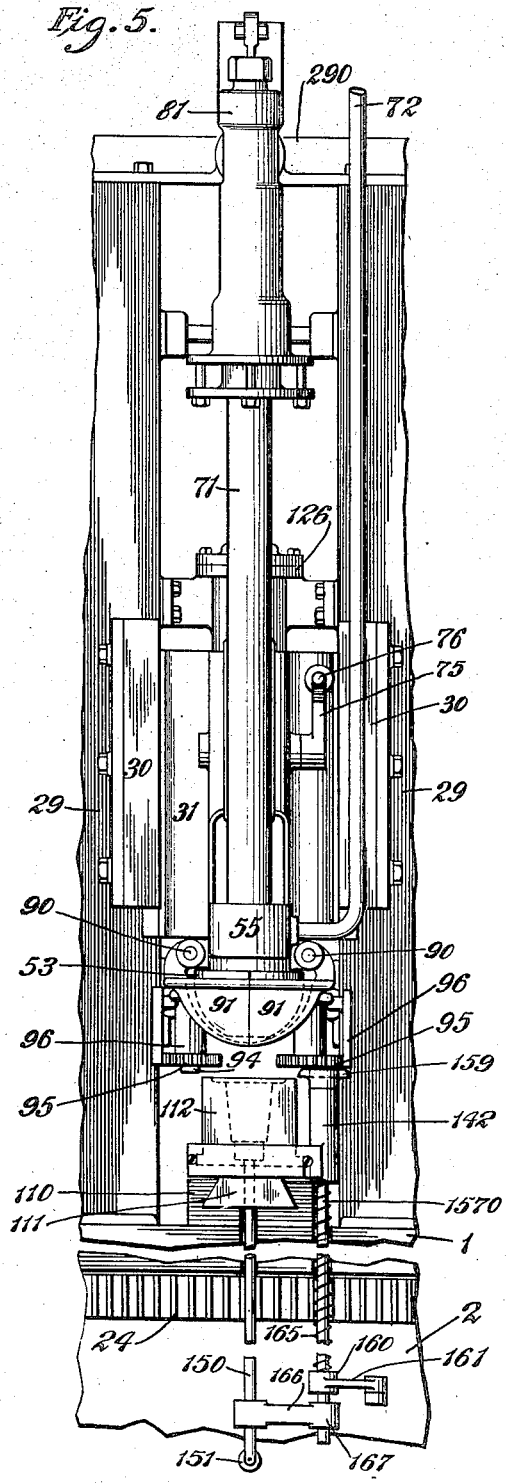
Figure 5 is a front elevation of one of the heads, showing the parts in position, as shown in Figure 3.
Figure 6:
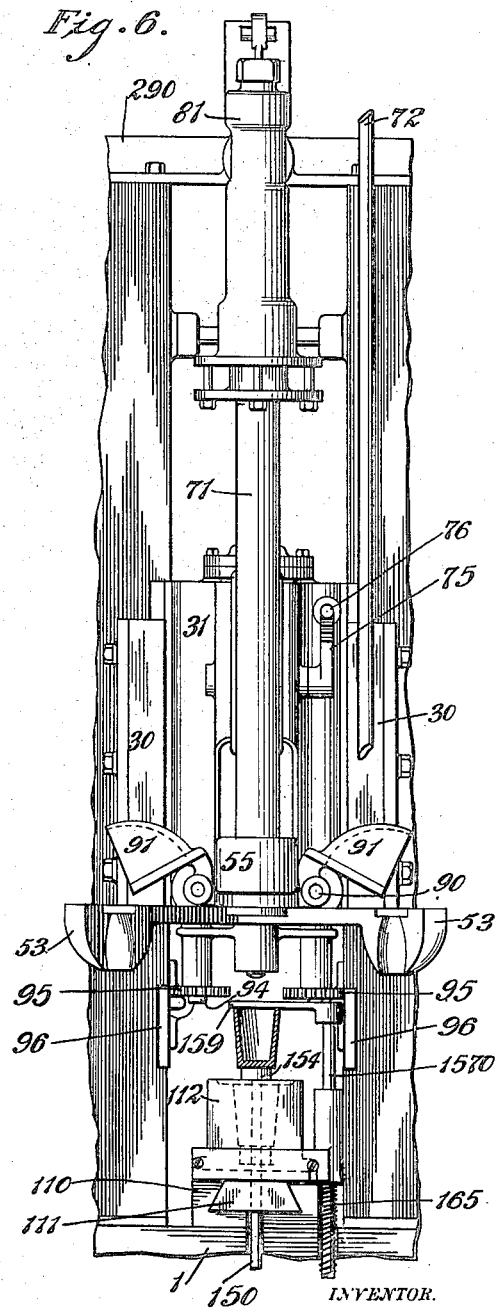
Figure 6 is a view similar to Figure 5, but showing the parts in the position shown in Figure 4.

Fixed to shafts 90 on the head 55, are a pair of cut-off members or blades 91. These cut-off members are arranged to envelop the sectional receiver in order to open and close the bottom of the receiver, and in order to cut off the supply of glass drawn into the receiver. The shafts 90 have each a bevel gear 92, meshing with a bevel gear 93, fixed to a short shaft 94, bearing in the crosshead. Each of these shafts have fixed thereto, a spur gear 95, meshing with toothed racks 96, carried by a pair of supports 29, on the travelling frame 3. Connected with the racks are links 97, supported in bearings 98, on a pair of supports 29, and these links are connected with a head 980, having an adjustable shank 99, yieldingly connected with a block 100, in a manner heretofore described, and this block carries a cam roll 101, engaging a cam groove in a stationary cam 102, fixed to the tubular support 46. Rotation of the travelling frame will cause the connections between the stationary cam 102 and the cut-off blades 91, to move these blades toward and from each other, as shown in Figures 5 and 6, in order to open and close the receiver, and in order to cut off the measured quantity of glass drawn from the tank. It will furthermore be noted that the yielding connection between the block 100 and the shank 99, permits yielding closing of the blades, thereby enabling firm cutting off engagement of these blades, and compensating for inequalities due especially to wear.

Figure 3:
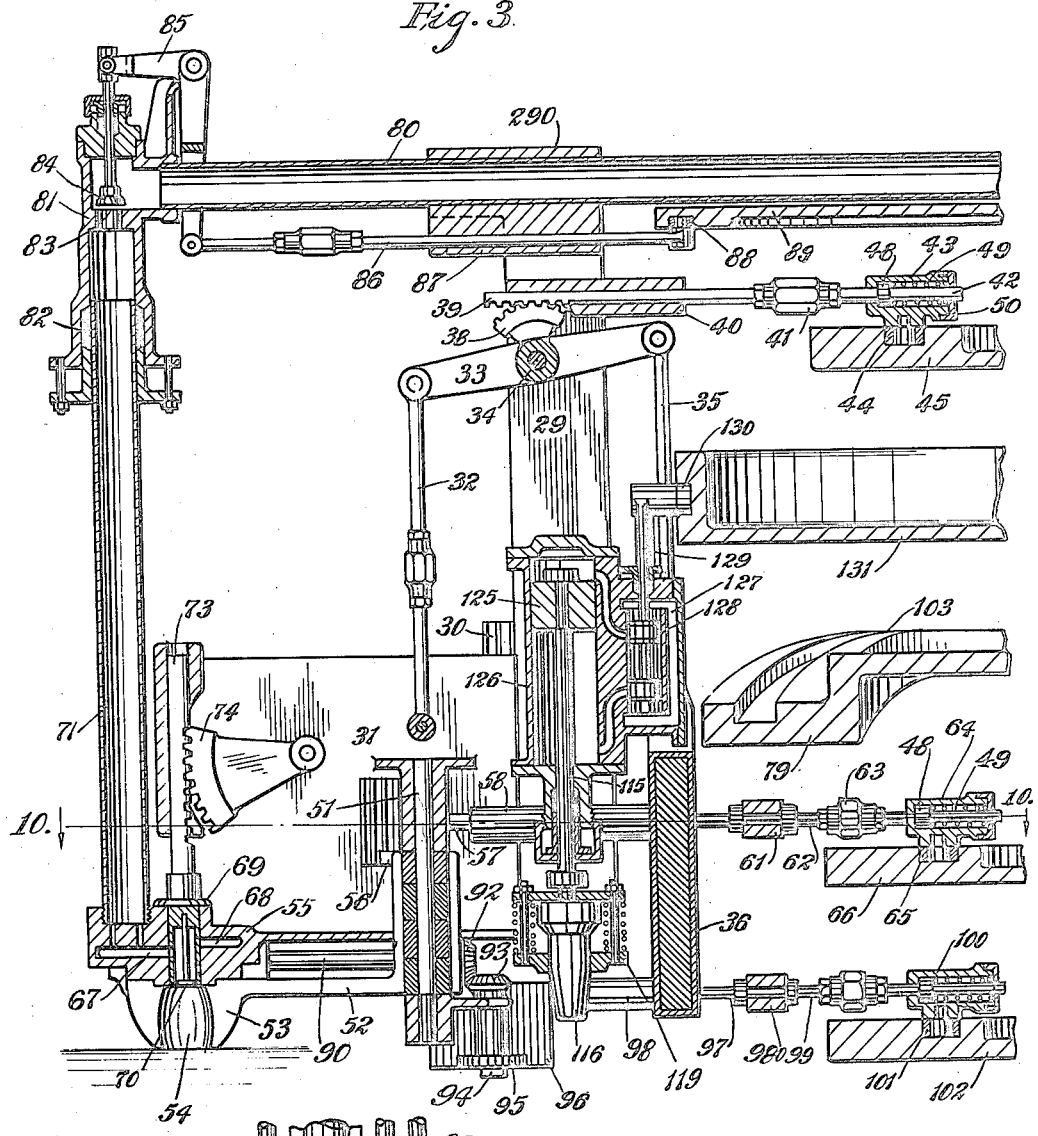
Figure 3 is an enlarged detail section of Figure 2, showing the left side of the machine.
Figure 8:
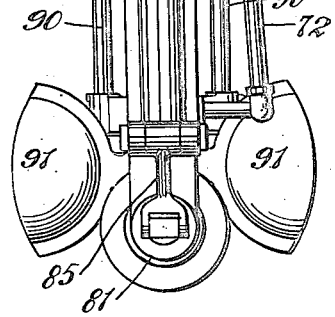
Figure 8 is a similar detail view showing the parts in the position shown in Figure 3.

It will be noted that the shank 76 is carried by the crosshead, and therefore, moves up and down with this crosshead. In order to permit such movement and still cause the cam roll to retain its engagement with its cam groove, the cam 79 is formed to rise and fall with the crosshead. This is shown in Figure 3, on the cam 79, the rise being shown at 103. The cams 45, 66, 89, and 102 are not required to conform to the rise and fall of the crosshead, since the cam rolls are stationary vertically, as their supporting shanks are mounted upon and guided in bearings on the supports 29. In case of the receiver sections and the cutters, a connection permitting rising and falling of the crosshead is accomplished by making the racks 57 and segments 96 wide, as shown in Figure 3, so that the spur gears 95 and segments can travel up and down.

As the travelling frame rotates the crosshead will be moved up and down through the medium of the connections with the stationary cam 45. This crosshead is held in raised position, so as to clear the glass tank 8, until it is immediately over the tank; the crosshead will thereupon descend to dip the receiver into the mass of molten glass in the tank, as shown in Figure 3, Figure 26, position A, and also in Figure 28, the cutter blades being, at this time, spread apart or opened, as shown in Figure 9. The valve 69 will thereupon be moved downwardly by its operating connection with the cam 79, to aline its port with the port 67 in the head, and thereby connect the receiver with the exhaust pipe 71. The valve 84 will, at this time, have been opened by its connection with the cam 89, so as to connect the exhaust pipe 71 with the exhaust pipe 80. The air will thereby be exhausted from the receiver cavity 54, so that this receiver cavity will become filled with molten glass by atmospheric pressure. Such filling of the receiver is accomplished as the travelling frame rotates; and as the crosshead 31 approaches the edge of the tank, this crosshead is again raised through its connection with its cam 45, so as to raise the receiver with the molten glass gathered therein, above the surface of the molten glass in the glass tank. The cutter blades 91 will now be actuated through their connections with the cam 102, to close, as shown in Figures 5 and 29, so as to cut off the molten glass gathered in the receiver, from that in the tank, and close the lower end of the receiver when the receiver is in position B, Figure 26. As the receiver clears the glass tank, the valve 69 will be partially raised, through its connection with its cam 79, to close the port 67, and the valve 84 will be depressed, through its connection with the cam 89, to close the port 83. There will be thus gathered and retained in the receiver, an accurately measured quantity of molten glass, which quantity is predetermined to be sufficient to form the article desired.

*The molding mechanism.*

Referring now to Figures 1 to 6 inclusive, 13 and 14, mounted on the base 3 of the travelling frame, are a series of plates 110, machined to form a series of radially extending guideways, in which slide a series of mold carriers 111. Since the mold carriers and the molds, as well as the formers and their actuating mechanism, are duplicates, the description of one molding mechanism will be sufficient.

Referring more particularly to Figures 13 and 14 mounted upon the carrier is a mold 112, having a mold cavity 113, of a form adapted to shape the article to be pressed, and provided at its top with an enlarged annular recess 114, for receiving the follower, as hereinafter described. Mounted upon a shank 115 is a former 116, corresponding to the mold, the former having a threaded shank 117, adapted for detachable connection with the threaded end of the shank 115, by means of a nut 118. Sliding on the former is a follower 119, attached to which are headed studs 120, passing loosely through a plate 121, mounted between the former and the nut 118 and interposed between the follower 119 and the plate 121, are springs 122. The follower is provided with a bevel projection 123, adapted to enter the recess 114, and the inner edge of this follower is provided with an annular recess 124, adapted to form the top edge of the article.

When the former descends into the mold, after the same has received a quantity of molten glass, this former will move down into the mold to shape the article. Before, however, the former has completed its stroke, the follower 119 will have entered the recess 114 in the mold, and as the former continues in its movement, the springs 122 will yield. It will also be noted that there is a lost motion between the plate 121 and the former, so that this lost motion will be taken up before the springs 122 will come into play to yield. The follower is thus first allowed to settle by gravity into the mold, and is thereafter subjected to the further yielding tension under the action of the springs 122.

Figure 4:
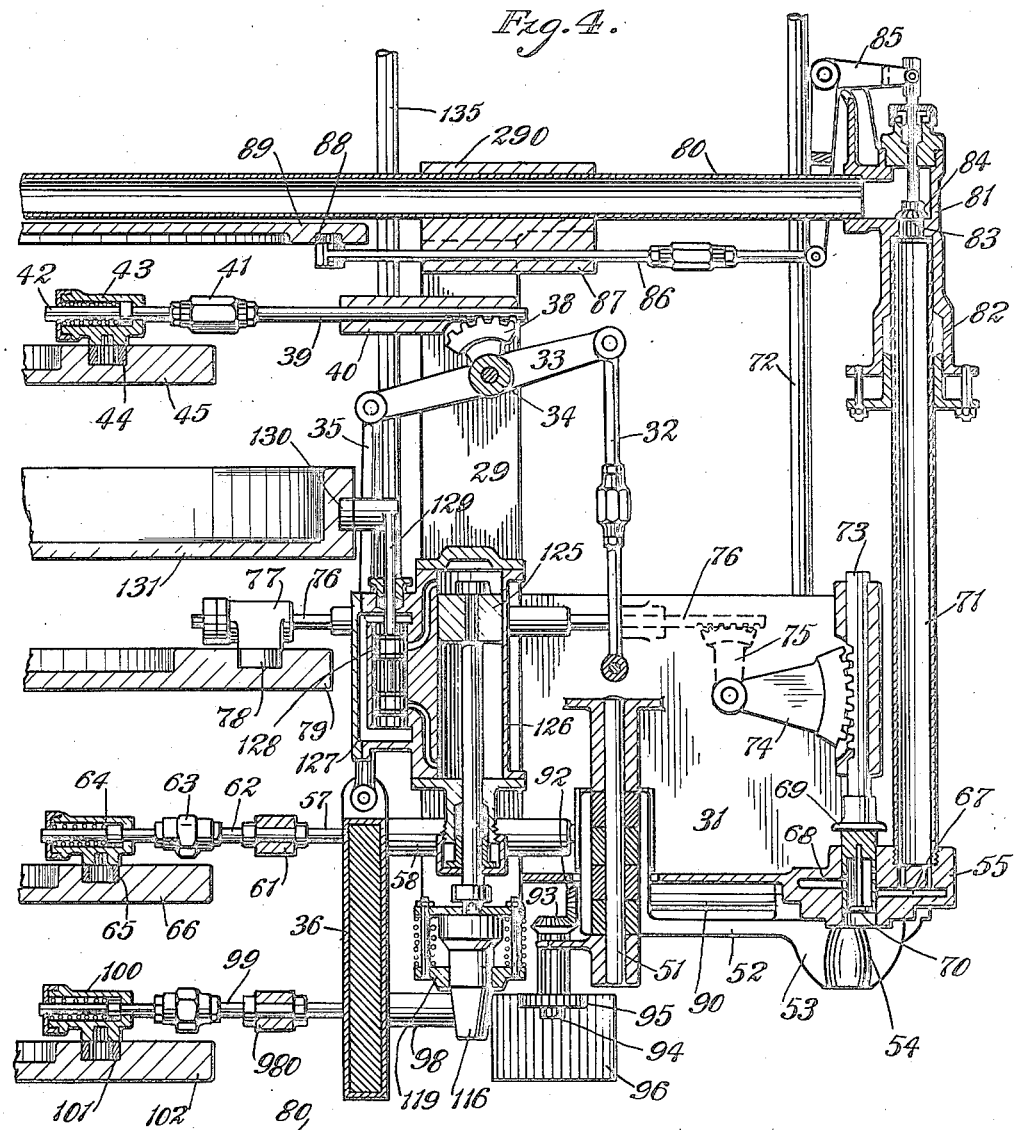
Figure 4 is an enlarged detail of Figure 2, showing the right side of the machine.

Referring now more particularly to Figures 3 and 4, the former shank 115 is connected to a piston 125, moving in a cylinder 126 of a compressed air motor mounted on one of the supports 29. The air chest 127 of this motor receives air from a suitable source of compressed air supply 135, and the supply of this air to the cylinder ports is controlled by a piston valve 128, the stem 129 of which carries a cam roll 130, engaging a cam groove in a stationary cam 131, fixed to the stationary supporting tube 46. As the travelling frame rotates, the piston valve 128 will be actuated, through its connection with the stationary cam 131, to control the admission of compressed air to, and the exhaust from, both ends of the cylinder 126, so as to move the former 116 up and down. The former is thus mechanically, but yieldingly, actuated by the fluid pressure means.

The carrier 111 has a cam roll 132 engaging a cam groove in a stationary cam 133, fixed to the supporting tube 46, and extending over the carrier. As the travelling frame rotates, the carrier, through its connection with the cam 133 will move radially outwardly and inwardly. The cam is so designed that when the carrier is in its extreme outer position, it will position the mold underneath the receiver of the gathering device, as shown in Figure 2, (right side), and Figure 29, while when the carrier is in its extreme inner position, it will position the mold directly underneath and in alinement with its former, as shown in Figure 2, (left side), and Figure 30.

Referring to Figures 26 and 28 to 31 inclusive, at the time that the gathering device is gathering the measured quantity of molten glass from the tank, as shown in Figures 26 and 28, the mold is retracted to a position underneath its former, and so as to clear the glass tank 8. At the time that the gathering device has cleared the tank and reached the position C, (Figure 26), at which time a measured quantity of molten glass will be retained in the receiver, the mold will move directly under the receiver, as shown in Figure 29. Immediately thereafter the cutter blades will be opened, (Figure 26, position C, dotted lines) so as to open the bottom of the receiver and permit the molten glass to drop into the mold cavity. In order to insure such dropping of the glass, the valve 69 will also, at this time, have been moved to connect the compressed air port 68 with the receiver, in order to forcibly eject the measured quantity of molten glass from the receiver into the mold cavity. As an additional insurance for the delivery of the measured quantity of molten glass from the receiver to the mold cavity, the receiver sections 53 are also, at this time, opened, as shown in dotted lines at C, Figure 26. In this way it is positively insured that the measured quantity of molten glass gathered by the receiver is delivered as a unit to the mold.

The mold will now be retracted, through the connection with its cam, and positioned under its former, as shown at D, Figure 26, and in Figure 30. The former will now be moved down into the mold to shape the article, as shown at E, Figure 26, and in Figure 31.

It will thus be seen that a measured quantity of molten glass is gathered from a source of glass supply, and is deposited in the mold and shaped. The parts are so constructed and the operation is so timed that the interval between the gathering of the measured quantity of glass and the shaping of the glass is so short that no chilling can take place. It will, of course, be understood that the parts becoming rapidly heated, will remain at a practically uniform temperature, and at a temperature sufficient to prevent chilling of the glass, at the same time preventing adhesion of the glass to the gathering and molding devices. The gathering device is so constructed to completely enclose the measured quantity of glass, avoiding all exposure and, therefore, avoiding chilling. The shape of the receiver is such that any radiation will be practically uniform; this is accomplished by forming the receiver nearly spherical or oval, so that all sharp edges tending to produce chilled ridges are avoided. Moreover, the cutting blades are so constructed that they cut the glass hanging down from the receiver, in opposite directions, and on account of their complete closing action through the yielding connection, the glass is sharply and completely cut off, thereby avoiding the formation of a seam at the point of cut-off, This fact, together with the fact that the cut-off blades completely enclose the receiver, prevents the formation of a chilled seam at the point of cut-off, and there will, therefore, be no seam in the pressed article. The gathering of the glass, its cut-off, and the delivery of the glass to the mold, is so rapid that chilling is completely avoided, so that a measured quantity of molten glass of uniform temperature is delivered to the mold, and is immediately pressed to shape before it can chill. This results in the formation of an article having no seams whatsoever.

A measured quantity of glass being deposited in the mold, it is insured that just sufficient glass will be in the mold to form the article; that is, the glass is so measured as to just fill a predetermined matrix formed between the former and the mold. Since the follower moves down upon the mold to complete the top edge of the matrix, the movement of the plunger into the mold under the yielding fluid pressure, will force the molten glass upwardly in the matrix until it is arrested by the rounded recess 124 of the follower. This insures the formation of a complete article. Now the springs 122 are of a tension sufficient to be greater than the pressure exerted on the follower through the glass by the fluid pressure motor. The result is, therefore, that the former will, under the yielding action of the fluid pressure motor, move down into the mold until the rising glass reaches the follower, at which time the former will stop. If, therefore, the measured quantity of glass deposited in the mold should be slightly greater than the normal matrix, the former will stop earlier in its stroke, and vice versa if the measured quantity of glass is slightly less. It is, therefore, insured that the shaping operation is completed in accordance with the matrix formed between the former and the mold, so that there will be no glass ejected between the mold and the follower, the formation of a rough edge is, therefore, avoided, and the formation of a smooth top edge of the article is insured. It is, therefore, insured that a completely pressed article of smooth contour is formed.

*The ejecting mechanism.*

In certain classes of glassware, such as glassware having external decorations, and having bulging walls, it is difficult to remove the pressed article from the mold. In accordance with this invention, therefore, the mold is made in sections which, after the formation of the article, are separated, thereby expanding the mold to permit ready removal of the article.

Referring now to Figures 15 to 22 inclusive, the carrier 111 is recessed to receive the mold sections 112. Each of these mold sections is provided with a shoulder 140, fitting under a sectional ring 141, so as to retain the section against vertical movement in the recess in the mold carrier, but permit radial movement of the section. In order to permit removal and replacement of these sections, the ring 141 is composed of sections pivoted on a bearing 142 on the mold carrier, engaging the free ends of the ring sections a locating or guide-pin 143 on the carrier, and these free ends are perforated to receive a securing pin 144. Mounted in a recess 145 of the carrier, is an actuator 146. This actuator has a wedge-shaped flange 147, adapted to engage corresponding wedge-shaped recesses 148 on the mold sections. The mold sections are thus interlocked with the actuator. In order to permit insertion of the mold sections into the actuator, the flange 147 is interrupted or recessed, as shown at 149, so that the mold sections may be inserted through these recesses, and then given an eighth turn to lock them in place. The mold sections are thus interlocked with said actuator. By moving the actuator 146 up and down, as shown in Figures 16 and 18, the mold sections may be spread apart or brought together to open and close the mold. In order to move this actuator, the latter has extending therethrough, a shank 150, which carries at its lower ends, a cam roll 151, adapted to engage a cam groove 152, on a cam 153, mounted on the sub-frame 5, and therefore, in fixed position. This cam 153 is mounted on the sub-frame 5, in a position to be engaged by the cam roll as the travelling frame moves to a position where the mold is to be opened, as shown at G, Figure 32, and this cam will move the shank 150, and with it the actuator 146, up and down to open and close the mold.

Referring again to Figures 15 to 22 inclusive, the mold is provided with a movable mold bottom 154, the hub or collar 155 of which has a lost motion pin and slot connection with the shank 150. In order to provide for a frictional connection between the actuator 146, and its shank, this shank slides in the actuator and is provided with a series of recesses 156, engaged by spring-pressed pawls 157, which engage these recesses when the parts are in the position shown in Figure 16, with the mold contracted and the bottom down. The construction is such that upon upward movement of the shank, the frictional connection between this shank and the actuator 146, will move this actuator up from the position shown in Figure 16, to the position shown in Figure 18, while the lost motion between the shank and the mold bottom is taken up. During this period of movement, the actuator will move up, on account of the frictional connection through the interlocking of the pawl 157 with the recesses 156, and the mold sections are spread apart, as shown in Figures 17 and 18. During this period, however, the mold bottom remains stationary. Further movement of the shank will raise the mold bottom and raise the articles out of the mold, as shown in Figure 20. At this time, the pawls 157 will be forced out of the recesses 156, and the shank will slide frictionally in the actuator 146. When the shank again moves downwardly, it will first move the mold bottom to the position shown in Figure 18, and thereafter the hub or collar 155 will engage the actuator and forcibly pull it down to the position shown in Figure 16, to forcibly contract the mold. The pawls will also, at this time, again drop into their recesses. It will thus be seen that the mold is expanded prior to the action of the ejecting device in raising the article out of the mold, so that if the article should have exterior decorations, or if this article should have bulging walls, the article is entirely freed from the mold before the ejection takes place.

In molding certain classes of articles, it is unnecessary that the mold be formed of sections; accordingly, a solid mold can be used. In order to retain such a solid mold in position, the sectional ring 141 is provided with set screws 1560, for clamping the mold in proper alined position on its carrier.

In view of the fact that the article is raised out of the mold while the travelling frame moves at a considerable speed, this article is liable to be thrown out, unless means are provided for retaining it in position. Referring now to Figures 5, 6, 19 and 20, mounted for rotatable and sliding movement in the bearing 142, is a shaft 1570, which has mounted on the top thereof, an arm 158, provided with a cap 159, adapted to take over and be engaged by the article. This cap is slightly recessed on its lower surface to form an annular ridge adapted to engage the top edge of the article. The shaft 1570 has mounted thereon, a collar 160 provided with two arms 161 and 162, adapted to respectively engage cams 163 and 164, on the sub-frame 5. A spring 165 is arranged on the shaft 1570, between the bearing 142 and the collar 160, so as to normally tend to move this shaft downwardly. The shank 150 has secured thereto, an arm 166, having a collar 167, sliding on the shaft 1570, so as to engage the collar 160, and move the shaft 1570 upwardly, the shaft being returned by the spring 165.

The parts are normally in the position shown in Figures 5 and 16, at which time the cap 159 will be out of the path of the mold, as also shown in dotted lines, Figure 19. As the mold moves from the position shown in Figure 16, to the position shown in Figure 18, the engagement of the cam roll on the arm 161, with the stationary cam 163, will rock the shaft 1570 to place the cap 159 over the mold, as shown in Figure 6, and also in Figures 18 and 19. During this period of movement, the mold sections are expanded and the collar 167 will move idly upwardly on the shaft 1570. After the mold bottom has moved upwardly a sufficient extent to move the article into engagement with the cap 159, the collar 167, moving with the shank 150, will engage the collar 160, thereby moving the shaft 1570, and its connected cap 159, upwardly with the mold bottom and the article, to the position shown in Figure 20. It will, therefore, be seen that when the article has been completely removed from the mold, it will be retained between the mold bottom and the retainer cap 159, so that the article will not drop away, but will be retained in position until it is taken off by the removing or conveying mechanism, as hereinafter described. After this, that is, when the article has been engaged by the removing or conveying mechanism, the arm 162 will be engaged by the cam 164, thereby swinging the retainer cap 159 back to dotted position, Figure 19, and the parts will then return to their original positions.

The removing or conveying mechanism.

Referring now more particularly to Figures 1, 23, 24 and 25, mounted on the subframe 5 is a base 170, carrying a shaft 171. Mounted on roller bearings 172 on the base, is a carrier comprising a lower plate 173, and an upper plate 174, connected by columns 175. The lower plate 173 is provided with gear teeth 176, so that the carrier may be rotated in timed relation with the travelling frame 3, through any suitable intermediate mechanism. The upper plate 174 is provided with a series of bearing posts 177, upon each of which is pivoted a pair of bell crank levers 178, each provided with a jaw 179, and each connected by a link 180, with a head 181, having a shank 182, connected with a block 183, moving in guideways 184, on the plate 174. Each of these blocks is provided with a cam roll 185, engaging a cam groove in a stationary cam 186, mounted on the shaft 171. The connection between the shank 182 and the block 183 is a yielding one through a spring 187, in the manner hereinbefore described, so that the jaws 179 will be yieldingly closed and positively opened. The cam groove in the cam 186 is so formed, as shown in Figure 1, that the jaws will be opened and closed at predetermined points in the movement of the carrier. The construction and operation is such that the jaws will close upon the article at the position G, Figure 26, and when the article has been raised out of the mold, as shown in Figure 20, in order to move this article transversely from the mold and out of the ejecting and retaining means, and these jaws are again opened in the position I, Figures 1 and 26, to drop the article on a suitable conveyor or other device, to permit it to be placed in the leers for the purpose of annealing.

The exhaust and compressed air system.

Referring to Figures 1 to 4 inclusive, the exhaust pipes 80 on the travelling frame, lead to a common chest 190, located in the center of the travelling frame and surrounding the top end 191 of a stationary pipe 192, extending vertically downward through the center of the machine, there being cooperating ports 193 between the chest and the head of this pipe, which keep the same in constant communication In order to permit for vertical adjustment of the machine, the lower end of the exhaust pipe 192 has a gland connection with a casing 194 connected with a main exhaust pipe 195, which leads to a suitable exhaust pump (not shown). This exhaust pump is constructed so as to maintain a vacuum of about twenty-six inches.

It will be noted that the radial exhaust pipes 80, are in constant communication with the main exhaust pipe 195, but that the exhaust pipes 71 are only in communication with the receiver when the air is to be exhausted therefrom. By closing the exhaust pipe 71, when the receiver is opened to the atmosphere, leakage is avoided to a considerable extent.

The compressed air pipes 72 lead to a common chest 196, rotating with the travelling frame, and the compressed air at low pressure, that is, a few pounds pressure, is supplied by a pipe 197 to a head 198, entering the chest 196, and communicating therewith through ports.

The compressed air pipes 135, connected with the various fluid pressure motors, lead from a common chest 199, surrounding a head 200, connected with a compressed air pipe 201, supplying the compressed air at a high pressure to the fluid pressure motors.

The cooling system.

It is essential to keep the mechanism moderately cool. Accordingly, the stationary tube 46 forms an air receiver for radiating the heat from the cams and connected mechanisms. Arranged below this tube is a flanged base 210, which supports this tube, and also the cam 133, on the subframe 5. In order to cool the mold carriers, the travelling frame immediately underneath the mold carriers is formed hollow, as shown at 211, and this hollow part is provided with ports 212, adapted to aline with ports 213, in a casing 214, formed by the support 210. This casing has a neck 215, telescoping with a pipe 216, by means of which air under pressure is supplied to the parts internally, for the purpose of cooling. The telescoping connection is provided, between the pipe 216 and the neck 215, for the purpose of permitting free adjustment of the machine vertically.

*Résumé of operation.*

It will be understood that there are a series of duplicate gathering, molding and ejecting mechanisms arranged radially on the travelling frame, and that these mechanisms come into action successively as they pass the glass tank. This glass tank is, of course, of the usual rotary construction, and is adapted to receive and maintain at a proper level, a supply of molten glass. Figures 1 and 2 show the relative positions of the machine with respect to the glass tank, Figure 26 shows a diagram with the different parts in their respective positions, Figure 27 shows a cam diagram showing the relative movements of the various devices, while Figures 28 to 32 inclusive, show the various positions corresponding to the positions as shown in Figure 26. In the description of the general operation, reference will be had to these figures.

As the travelling frame moves in the direction of the arrow, Figures 1 and 26, each device of a set of devices will pass through a series of operations during one complete revolution of the travelling frame. As the frame travels with a set of devices from position H to position A, Figure 26, the crosshead will be lowered to dip the receiver into the supply of molten glass, and after the receiver has been dipped, as shown in Figure 28, the controlling valve 69 is operated to exhaust the air from the receiver, in order to fill this receiver with a measured quantity of glass. As the frame travels from position A to position B, Figure 26, the cross head is raised to cause the receiver to clear the tank, and concurrently the cutter blades close to cut off the supply of molten glass, and close the bottom of the receiver. As the frame travels from position B to position C, Figure 26, the cross head is again dropped, and concurrently the mold is moved underneath the receiver, as shown in Figure 29. Immediately thereafter the cutters open to open the receiver, the valve 69 is operated to supply compressed air to the receiver, and the receiver sections open up, thereby causing the complete ejection of the measured quantity of glass from the receiver into the mold. As the frame travels from position C to position D, Figure 26, the filled mold is carried and positioned underneath the former, as shown in Figure 30. As the mold travels from position D to position E, Figure 26, the former will descend to shape the molten glass in the mold to form the article, as shown in Figure 31. The former will now again rise during the travel of the frame beyond position E, Figure 26, and when the former is still stationary radially, and the mold will then be moved radially outwardly until it is again beneath the receiver, as shown in position F, Figure 26. During this movement of the frame, the cross head will again rise, so as to be again in its highest position before the set reaches position F. While the frame moves from position F to F', Figure 26, the ejector and the retainer will be operated, (and where a sectional mold is utilized the mold will be expanded to release the article), and the article will be ejected from the mold, as shown in Figure 32. The travelling frame having reached position G, the removing device will now engage the article as ejected from the mold, and remove it, and deposit it in position I, Figure 26. As the frame moves from position G to position H, Figure 26, the receiver sections will be closed, the ejector and the retainer will be retracted, (and where the mold is a sectional mold it will be again contracted), and the parts will be placed in their original positions, thereby completing the cycle of operations. It will be understood that each set of mechanisms will successively pass through the same cycle of operation, and in the same manner.

It will thus be seen that the invention accomplishes its objects. The machine is designed to accommodate it to the peculiar conditions under which an automatic machine for making pressed glassware must operate. A measured quantity of molten glass is taken from a source of supply, deposited in a mold, this measured quantity of glass is pressed, and after pressing is ejected and removed to deliver the complete article. The entire cycle of operations is performed in such a manner, that chilling of the glass, from the time it is gathered until it is pressed into the complete article, is avoided. It will, of course, be understood that prior to starting the formation of the glass articles, the entire machine is heated, and the parts remain hot during the regular operation, so that chilling of the glass is avoided. Moreover, the glass is pressed in such a manner as to always form a complete article. It is, therefore, insured that a complete pressed article of glassware is produced without seams or wrinkles, so that it is clear and smooth. The machine is so constructed as to have great capacity, but the parts are so arranged and constructed that overheating is avoided, and the article is allowed to cool sufficiently after being pressed, to permit its removal without deformation.

While various combination and subcombinations have been described and illustrated in detail it is to be understood that the subcombinations are capable of use independent of other subcombinations. It is further obvious that various changes may be made in the details of construction, operation and manipulation, without departing from the spirit of this invention. It is, therefore, to be understood that this invention is not to be limited or restricted to the details described and shown.

Having thus described the invention what is claimed is:

1. A machine for making pressed glassware, comprising, a source of glass supply, a mould, a receiver adapted to gather a measured quantity of glass from said source, means for dipping and for exhausting said receiver to gather the glass including main and auxiliary valves in series, said main valve being adapted to remain open for the full dip of said receiver, and said auxiliary valve being adapted to close before said receiver rises, means for depositing the glass in said mould, and a former adapted to co-operate with said mould to press the glass to shape.

2. In a machine for making glassware having glass molding means including a mold, mechanism for removing the formed article from the mold, comprising, an ejector movable through the bottom of the mold, and a cooperating retainer movable over the top of the mold.

3. In a machine for making glassware having glass molding means including a mold, mechanism for removing the formed article from the mold, comprising, an ejector movable through the bottom of the mold, a cooperating retainer movable over the top of the mold, and means for removing the article from said ejector and said retainer.

4. In a machine for making glassware, the combination with a mold, of an ejector movable through the bottom of said mold to raise the formed article, a retainer movable over the top of said mold to be engaged by the article, and means for moving said ejector and said retainer in cooperative relation.

5. In a machine for making glassware, the combination with a sectional mold, of an ejector movable through the bottom of said mold to raise the formed article, a retainer movable over the top of said mold to be engaged by the article, and means for opening said mold and for moving said ejector and said retainer in cooperative relation.

6. In a machine for making glassware, the combination with a mold, of an ejector movable through the bottom of said mold to raise the formed article, a retainer movable over the top of said mold to be engaged by the article, and means for moving said ejector and said retainer in cooperative relation, adapted to move said retainer over said mold and thereafter raise said ejector and said retainer with the article.

In testimony whereof I affix my signature this 22nd day of October, 1917.

THOMAS C. MOORSHEAD.